United States Patent
Wang et al.

(10) Patent No.: US 8,593,914 B2
(45) Date of Patent: *Nov. 26, 2013

(54) METHOD AND SYSTEM FOR OPTICALLY COUPLING A LASER WITH A TRANSDUCER IN AN ENERGY ASSISTED MAGNETIC RECORDING DISK DRIVE

(75) Inventors: Lei Wang, Fremont, CA (US); Shing Lee, Fremont, CA (US); Sergei Sochava, Sunnyvale, CA (US); Hyojune Lee, San Jose, CA (US); Arkadi B. Goulakov, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 12/976,770

(22) Filed: Dec. 22, 2010

(65) Prior Publication Data
US 2012/0163137 A1   Jun. 28, 2012

(51) Int. Cl.
*G11B 11/00* (2006.01)

(52) U.S. Cl.
USPC ............. 369/13.33; 369/112.27; 369/13.13; 438/110; 29/603.07

(58) Field of Classification Search
USPC .......... 369/13.33, 13.32, 13.24, 13.14, 13.03, 369/13.02, 13.12, 13.01, 13.35, 13.17, 369/112.27, 112.01; 360/59, 125.31, 360/125.74; 29/603.07, 603.09; 438/110, 438/113
See application file for complete search history.

(56) References Cited

U.S. PATENT DOCUMENTS

| | | | |
|---|---|---|---|
| 6,744,582 B2 | 6/2004 | Shimoda | |
| 6,747,257 B1 | 6/2004 | Farnsworth | |
| 7,310,206 B2 | 12/2007 | Liu | |
| 7,480,214 B2 | 1/2009 | Challener | |
| 7,688,689 B2 | 3/2010 | Gage | |
| 7,710,686 B2 | 5/2010 | Kim | |
| 7,724,470 B2 | 5/2010 | Poon | |
| 8,012,804 B1 * | 9/2011 | Wang et al. | 438/110 |
| 8,116,171 B1 * | 2/2012 | Lee | 369/13.01 |
| 8,125,856 B1 * | 2/2012 | Li et al. | 369/13.01 |
| 2006/0005216 A1 | 1/2006 | Rausch | |
| 2006/0233061 A1 | 10/2006 | Rausch | |
| 2007/0081427 A1 | 4/2007 | Suh | |
| 2008/0158730 A1 | 7/2008 | Furukawa | |
| 2008/0204916 A1 | 8/2008 | Matsumoto | |
| 2008/0316872 A1 | 12/2008 | Shimizu | |
| 2009/0059411 A1 | 3/2009 | Tanaka | |
| 2010/0208378 A1 | 8/2010 | Seigler | |
| 2010/0208391 A1 | 8/2010 | Gokemeijer | |

* cited by examiner

*Primary Examiner* — Ali Neyzari (57) ABSTRACT

A method and system for providing an energy assisted magnetic recording (EAMR) head are described. The EAMR head includes a laser, a slider, and an EAMR transducer. The laser has a main emitter and at least one alignment emitter. The slider includes at least one alignment waveguide, at least one output device, and an air-bearing surface (ABS). The alignment waveguide(s) are aligned with the alignment emitter(s). The EAMR transducer is coupled with the slider and includes a waveguide aligned with main emitter. The waveguide is for directing energy from the main emitter toward the ABS.

21 Claims, 5 Drawing Sheets

METHOD AND SYSTEM FOR OPTICALLY COUPLING A LASER WITH A TRANSDUCER IN AN ENERGY ASSISTED MAGNETIC RECORDING DISK DRIVE

BACKGROUND

Figure 1:
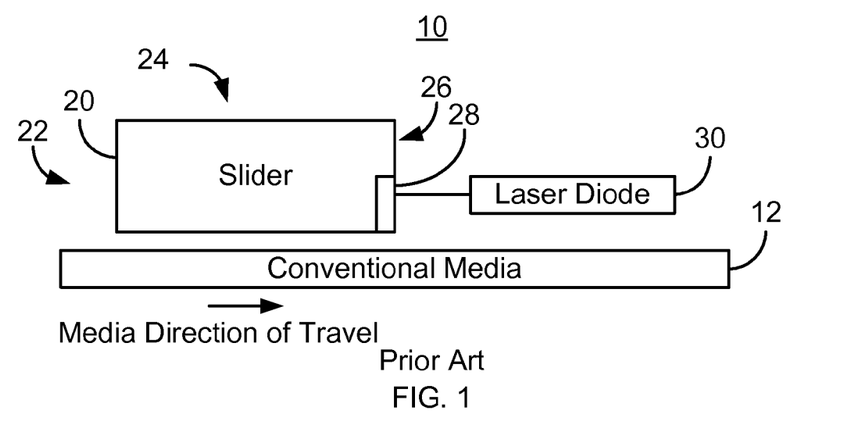
FIG. 1 depicts a side view of a conventional EAMR disk drive.

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Although termed "edges", the leading edge 22 and trailing edge 26 are surfaces of the slider 20. The leading edge 22 and trailing edge 26 are so termed because of the direction the conventional media 12 travels with respect to the EAMR transducer 28. Other components that may be part of the conventional EAMR disk drive 10 are not shown. The conventional slider 20 is typically attached to the suspension at its back side 24. A conventional EAMR transducer 22 is coupled with the slider 20.

The laser diode 30 is coupled in proximity to the EAMR transducer 22. Light from an emitter (not separately shown) on the conventional laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional media 12. The conventional EAMR transducer 22 magnetically writes to the conventional media 12 in the region the conventional media 12 is heated.

Figure 2:
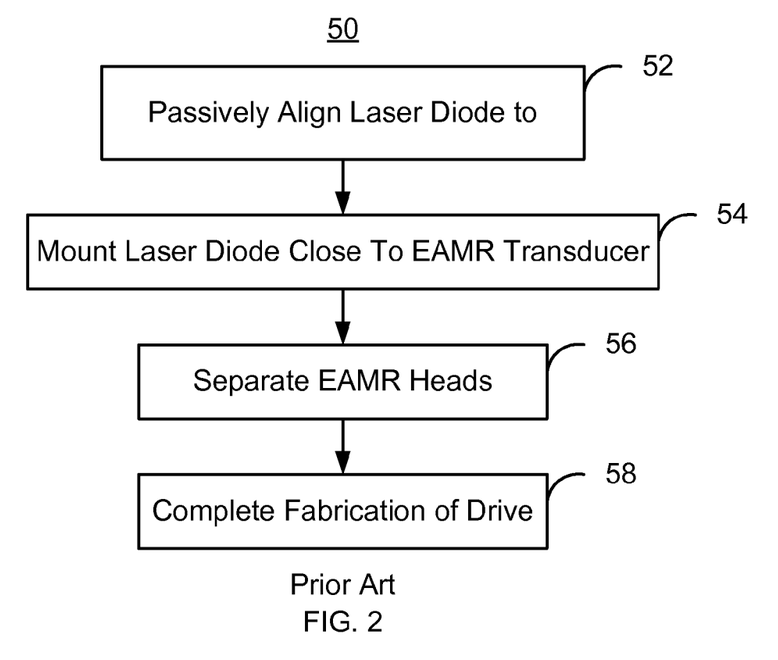
FIG. 2 is a flow chart depicting a conventional method for fabricating a conventional EAMR disk drive

FIG. 2 depicts a conventional method 50 for fabricating a portion of the conventional EAMR disk drive 10. For simplicity, only a portion of the method 50 is described. The emitter on the conventional laser diode 30 is aligned to the grating on the conventional EAMR transducer 28. The laser diode 30 is then mounted, for example to the slider 20 or flexure (not shown), via step 54. The EAMR heads may then be separated, via step 56. For example, the substrate holding the EAMR transducers 28 may be cleaved or otherwise cut into individual sliders 20. The front side of the substrate, on which the EAMR transducer 28 is fabricated, becomes the trailing edge 26 of the slider 20. Alternatively, the EAMR heads might be separated prior to the laser diode 30 being mounted. However, in both cases, the laser diode is mounted in proximity to the EAMR transducer 26. The fabrication of the conventional drive 10 may then be completed. For example, the conventional EAMR head including the conventional slider 20 and conventional EAMR transducer 28 may be mounted on a flexure and then in a disk drive.

Although the conventional EAMR disk drive 10 may function, manufacturing the conventional EAMR disk drive 10 at an acceptable cost and with sufficient optical efficiency may be problematic. More specifically, aligning the laser diode with the EAMR transducer 28 may be difficult. Passive alignment, which relies on preset features such as fiducials, can be relatively easily accomplished. However, the laser diode 30 may not be closely aligned with the EAMR transducer 28 after passive alignment. As a result, less of the optical energy from the laser diode may be coupled into the EAMR transducer 28. The optical efficiency of the EAMR transducer 28 and, therefore, performance may be adversely affected. Conversely, more closely aligning the laser diode 30 with the EAMR transducer 28 may be costly and/or time consuming. Such active alignment relies upon monitoring the output of the EAMR transducer 28 near the surface that will be the ABS. Typically, the output is near-field emission from a near-field transducer (NFT) at the ABS. However, this process is difficult. Alignment may thus be time consuming, more costly and may not result in significantly improved alignment. Manufacturability of the EAMR disk drive 10 may be adversely affected.

Accordingly, what is needed is a system and method for improving manufacturability and performance of an EAMR disk drive.

BRIEF SUMMARY OF THE INVENTION

A method and system for providing an energy assisted magnetic recording (EAMR) head are described. The EAMR head includes a laser, a slider, and an EAMR transducer. The laser has a main emitter and at least one alignment emitter. The slider includes at least one alignment waveguide, at least one output device, and an air-bearing surface (ABS). The alignment waveguide(s) are aligned with the alignment emitter(s). The EAMR transducer is coupled with the slider and includes a waveguide aligned with main emitter. The waveguide is for directing energy from the main emitter toward the ABS.

DETAILED DESCRIPTION OF THE EMBODIMENTS OF THE INVENTION

Figure 3:
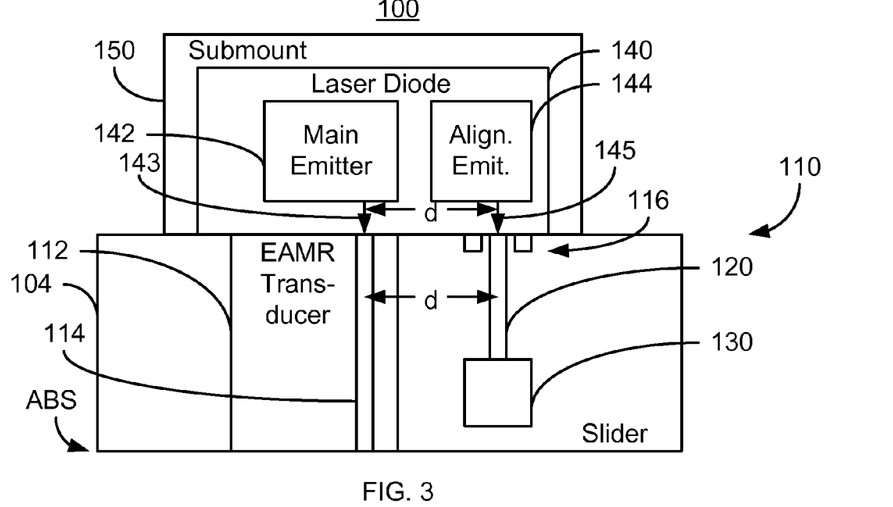
FIG. 3 depicts an exemplary embodiment of a portion of an EAMR disk drive.

FIG. 3 is a diagram depicting a portion of an EAMR disk drive 100. For clarity, FIG. 3 is not to scale. For simplicity not all portions of the EAMR disk drive 100 are shown. In addition, although the disk drive 100 is depicted in the context of particular components other and/or different components may be used. In addition, although single components, such as lasers, are shown, multiple components may be used in other embodiments. Further, the arrangement of components may vary in different embodiments.

The EAMR disk drive 100 includes media (not shown) and an EAMR head 110. The EAMR head 110 includes a slider 104, EAMR transducer 112, alignment waveguide 120, optional output device 130, and laser 140 that is optically coupled with the EAMR transducer 112. In the embodiment shown, the laser 140 is a laser diode that is coupled to the submount 150. Although shown as coupled with the back side of the slider 104, the laser 140 may be located elsewhere. The laser 140 is a multi-emitter laser. In the embodiment shown, the laser 140 includes two emitters 142 and 144. Main emitter 142 outputs laser beam 143, while alignment emitter 144 provides laser beam 145. The relevant portions of the emitters 142 and 144 (i.e. the beams 143 and 145) are separated by a distance, d. In some embodiments, the spacing d is desired to be sufficiently large that one emitter 142 or 144 does not impact performance of the other emitter 144 or 142, respectively. In some embodiments, this spacing is 10-20 microns. However, in other embodiments, particularly where the emitters may be independently powered, the emitters 142 and 144 may have a different spacing. For example, in some embodiments, the emitters 142 and 144 may be spaced apart by as little as 5 microns or less. In some embodiments, the main emitter 142 and alignment emitter 144 are configured to be powered independently. For example, the alignment emitter 144 might be on while the main emitter 142 is off, or vice versa. Further, the alignment emitter 144 and main emitter 142 might both be powered on. In other embodiments, the emitters 142 and 144 cannot be powered independently.

EAMR transducer 112 typically includes components used to magnetically write to the media such as pole(s), shield(s), coil(s), an input grating, and, in some embodiments, a near-field transducer (NFT). The EAMR transducer 112 also includes a waveguide 114 that is aligned with the main emitter 142. The waveguide 114 is aligned with the laser beam 143 of the main emitter 142 and directs energy in the laser beam 143 toward the ABS. In operation, energy, typically in the form of light is emitted from the main emitter 142 and coupled into the waveguide 114 of the EAMR transducer 112. Although not shown, a grating may be used to couple the energy from the main emitter 112. The waveguide 112 directs the energy toward an NFT (not shown) that resides at or near the ABA. The NFT couples energy to the media. Coils (not shown) energize the pole (not shown), which magnetically writes to the heated region of the media.

In addition to the EAMR transducer 112, the slider 104 includes at least one alignment waveguide, at least one output device, and an ABS. In the embodiment shown, a single alignment waveguide 120 and a single output device 130 are shown. The alignment waveguide 120 is aligned with the alignment emitter 144. The alignment waveguide 120 is also precisely spaced from the waveguide 114. The alignment waveguide 120 is the same distance from the waveguide 114 as the alignment emitter 144 is from the main emitter 142. Thus, the alignment waveguide 120 may be aligned with the laser beam 145 from the alignment emitter 144 when the waveguide 114 is aligned with the laser beam 143 from the main emitter 142. The alignment waveguide 120 directs energy in the laser beam 145 to the output device 130. In some embodiments, the alignment waveguide 120 is identical to the waveguide 114 except in length and that the alignment waveguide 120 may terminate at the output device 130. The output device 130 couples the energy provided by the alignment waveguide 120 out. Thus, the energy from the alignment emitter 144 may be monitored through the output device 130. In some embodiments, the output device 130 is an output grating. In the embodiment shown, the slider 104 also includes fiducial marks 116. In the embodiment shown, fiducial marks 116 are only shown proximate to the alignment waveguide 120. However, in other embodiments, the fiducial marks 116 may be located elsewhere.

The alignment emitter 144, alignment waveguide 120, output device 130 and optional fiducial marks 116 may be used in aligning the laser 140 with the slider 104. The fiducial marks 116 may be used to passively align the laser 140 with the slider 104. More specifically, the fiducial marks 116 may be used in passively aligning the alignment emitter 144 with the alignment waveguide 120. Thus, a rough alignment can be accomplished.

The alignment emitter 144, alignment waveguide 120, and output device 120 may be used to actively align the laser 140 with the slider 104. The alignment emitter 144 is energized during active alignment. The alignment waveguide 120 directs the energy from the alignment emitter 144 to the output device 130. The energy from the output device 130 may be relatively easily monitored, for example via a photodetector (not shown). When the energy output by the output device 130 exceeds a threshold or is within a tolerance of a maximum, the alignment emitter 144 is sufficiently aligned with the alignment waveguide 120. The distance between the alignment emitter 144 and the main emitter 142 is substantially the same as the distance between the alignment waveguide 120 and the waveguide 114. Thus, aligning the alignment emitter 144 with the alignment waveguide 120 also aligns the waveguide 114 with the main emitter 142. Consequently, the quality and ease of alignment of the laser 140 with the EAMR transducer 112 may be improved. Further, the alignment laser 144 may be independently powered. Thus, during operation of the EAMR disk drive, the alignment emitter 144 may be turned off while the main emitter 142 is used in magnetic recording. Thus, the benefits in alignment may be achieved via the alignment emitter 144 without adversely affecting later performance. Manufacturability and performance of the EAMR transducer 112 may thus be improved.

Figure 4:
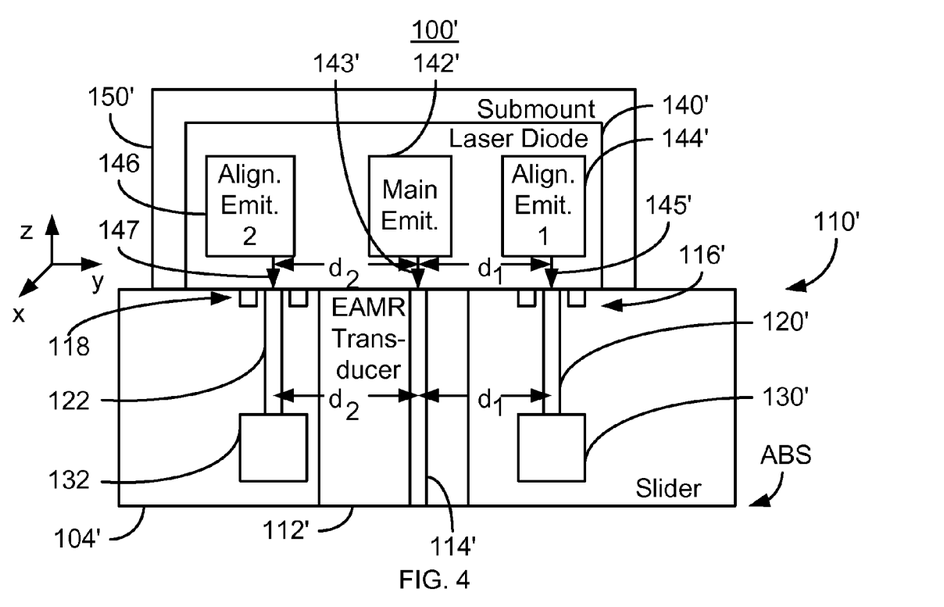
FIG. 4 depicts another exemplary embodiment of a portion of an EAMR disk drive.

FIG. 4 is a diagram depicting a portion of an EAMR disk drive 100'. For clarity, FIG. 4 is not to scale. For simplicity not all portions of the EAMR disk drive 100' are shown. In addition, although the disk drive 100' is depicted in the context of particular components other and/or different components may be used. In addition, although single components, such as lasers, are shown, multiple components may be used in other embodiments. Further, the arrangement of components may vary in different embodiments.

The EAMR disk drive 100' includes components analogous to those in the EAMR disk drive 100. The EAMR disk drive 100' thus has an EAMR head 110' including a slider 104', EAMR transducer 112', alignment waveguide 120', output device 130', and laser 140' that is optically coupled with the EAMR transducer 112'. These components 104', 110', 112', 114', 116', 120', 130', 140', 142'. 143', 144', 145', and 150' correspond to the components 104', 110, 112, 114, 116, 120, 130, 140, 142, 143, 144, 145, and 150, respectively. In the embodiment shown, the laser 140' is a laser diode that is coupled to the submount 150'. Although shown as coupled with the back side of the slider 104', the laser 140' may be located elsewhere. The laser 140' is a multi-emitter laser. In the embodiment shown, the laser 140' includes three emitters 142', 144', and 146. Main emitter 142' corresponds to the main emitter 142. The main emitter 142' resides between alignment emitters 144' and 146. The alignment emitters 144' and 146 are separated from the main emitter 142' by distances $d_1$ and $d_2$, respectively. In some embodiments, the spacings $d_1$ and $d_2$ are desired to be sufficiently large that one emitter 142', 144', or 146 does not impact performance of the other emitters 142', 144', or 146. In some embodiments, this spacing is 10-20 microns. However, in other embodiments, particularly where the emitters may be independently powered, the emitters 142', 144', and 146 may have a different spacing. For example, in some embodiments, the emitters 142', 144', and 146 may be spaced apart by as little as 5 microns or less. In the embodiment shown, the spacings $d_1$ and $d_2$ are shown as different. In other embodiments, the spacing $d_1$ and $d_2$ may be the same. In some embodiments, the main emitter 142' and alignment emitters 144' and 146 are configured to be powered independently. For example, the alignment emitters 144' and/or 146 might be on while the main emitter 142' is off, or vice versa. Further, the alignment emitters 144' and/or 146 and main emitter 142' might both be powered on. In other embodiments, the emitters 142', 144', and 146 cannot be powered independently.

EAMR transducer 112' includes components used to magnetically write to the media such as pole(s), shield(s), coil(s), an input grating, and, in some embodiments, an NFT. The EAMR transducer 112' also includes a waveguide 114' that is aligned with the main emitter 142'. The waveguide 114' is thus analogous to the waveguide 114. The EAMR transducer 112' also functions in an analogous manner to the transducer 112.

The slider 104' includes alignment waveguides 120' and 122 as well as output devices 130' and 132. The alignment waveguide 120' is aligned with the alignment emitter 144'. The alignment waveguide 122 is aligned with alignment emitter 146. The alignment waveguides 120' and 122 are also precisely spaced from the waveguide 114'. The alignment waveguides 120' and 122 are the same distances, $d_1$ and $d_2$, from the waveguide 114' as the alignment emitters 144' and 146 are from the main emitter 142'. The alignment waveguides 120' and 122 direct energy in the laser beams 145' and 147 to the output devices 130' and 132, respectively. In some embodiments, the alignment waveguides 120' and 122 are identical to the waveguide 114' except in length and that the alignment waveguides 120' and 122 may terminate at the output device 130' and 132, respectively. The output devices 130' and 132 couple out the energy provided by the alignment waveguides 120' and 122, respectively. In some embodiments, each of the output devices 130' and 132 is an output grating. In the embodiment shown, the slider 104' also includes fiducial marks 116' and 118. In the embodiment shown, fiducial marks 116' and 118 are only shown proximate to the alignment waveguides 120' and 122, respectively. However, in other embodiments, the fiducial marks 116' and 118 may be located elsewhere.

The alignment emitters 144' and 146, alignment waveguides 120' and 122, output devices 130' and 132, and optional fiducial marks 116' and 118 may be used in aligning the laser 140' with the slider 104'. The fiducial marks 116' and 118' may be used to passively align the laser 140' with the slider 104'. The alignment emitters 144 and 146, alignment waveguides 120' and 122, and output devices 120' and 122 may be used to actively align the laser 140 with the slider 104. This may be accomplished in a manner analogous to that used for the EAMR disk drive 100. However, two alignment waveguides 120' and 122 are used. Thus, alignment in the y direction and the x direction as shown in FIG. 4 may be improved. For example, rotations in the x-y plane of the laser 140' with respect to the slider 104' around an axis close to the alignment waveguide 144' may be accounted for. Consequently, the quality and ease of alignment of the laser 140' with the EAMR transducer 112' may be improved. Manufacturability and performance of the EAMR transducer 112' may thus be improved. The alignment emitter 144'/146 may be independently powered. Thus, the alignment emitters 144' and 146 may be turned off during regular operation of the EAMR disk drive 100'. Thus, these improvements in alignment may be achieved without adversely affecting later performance.

Figure 5:
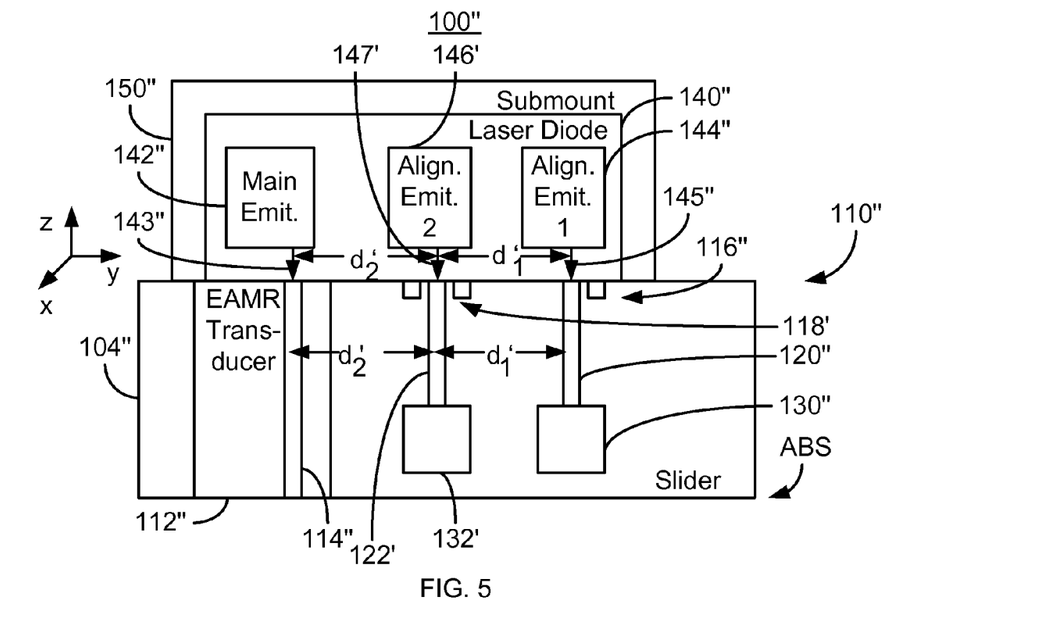
FIG. 5 depicts another exemplary embodiment of a portion of an EAMR disk drive.

FIG. 5 is a diagram depicting a portion of an EAMR disk drive 100". For clarity, FIG. 5 is not to scale. For simplicity not all portions of the EAMR disk drive 100" are shown. In addition, although the disk drive 100" is depicted in the context of particular components other and/or different components may be used. In addition, although single components, such as lasers, are shown, multiple components may be used in other embodiments. Further, the arrangement of components may vary in different embodiments.

Figure 6:
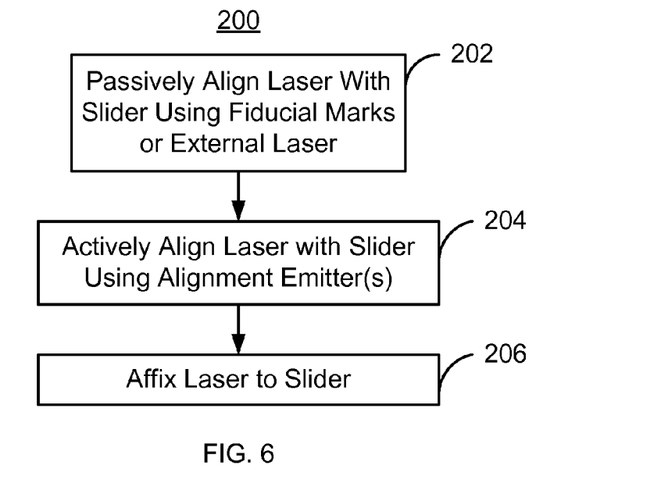
FIG. 6 depicts an exemplary embodiment of a method for fabricating an EAMR disk drive.

The EAMR disk drive 100" includes components analogous to those in the EAMR disk drive 100 and 100'. In particular, the EAMR disk drive 100" includes components 104", 110", 112", 114", 116", 118', 120", 122', 130", 132', 140", 142", 143", 144", 145", 146', 147' and 150" correspond to the components 104', 110', 112', 114', 116', 118, 120', 122, 130', 132, 140', 142', 143', 144', 145', 146, 147, and 150, respectively. However, in the EAMR disk drive 100", the alignment emitters 144' and 146' are both on the same side of the main emitter 142". Similarly, the alignment waveguides 120" and 122' are on the same side of the waveguide 114". However, the function of the EAMR transducer 112", main emitter 142", alignment emitters 144" and 146', alignment waveguides 120" and 122', and output devices 130" and 132', respectively, are substantially the same as in the EAMR disk drive 100'. More specifically, use of the two alignment waveguides 120" and 122' may improve alignment over the use of a single alignment waveguide. Thus, alignment in the y direction and the x direction as shown in FIG. 6 may be improved. For example, rotations in the x-y plane of the laser 140' with respect to the slider 104' around an axis close to the alignment waveguide 144' may be accounted for. Consequently, the quality and ease of alignment of the laser 140' with the EAMR transducer 112" may be improved. Manufacturability and performance of the EAMR transducer 112'/may thus be improved. The alignment emitter 144"/146' may be independently powered. Thus, the alignment emitters 144" and 146' may be turned off during regular operation of the EAMR disk drive 100". Thus, these improvements in alignment may be achieved without adversely affecting later performance.

FIG. 6 depicts an exemplary embodiment of a method 200 of forming a portion of an EAMR disk drive. For simplicity, some steps may be omitted, combined, performed in parallel, performed in another sequence, and/or interleaved. The method 200 is described in the context of the EAMR disk drives 100/100'/100". However, the method 200 may be used to fabricate other EAMR disk drives. In addition, the method 200 is described in the context of fabricating a single disk drive 100/100'/100". However, multiple transducers, sliders, and multiple disk drives may be fabricated substantially in parallel.

The laser 140/140'/140" is passively aligned with the slider 104/104'/104", via step 202. In some embodiments, step 202 is performed using fiducials 116/116'/116" and 118/118'. Alternatively, another external laser might be used. For example, an external laser might be optically coupled to the output 130, 130', 130", 132, or 132'. In such a case, the light travels backwards along the waveguide 120, 120', 120", 122, or 122'. The light from the external laser may be detected at the input of the waveguide 120, 120', 120", 122, or 122'. In essence, light from the external laser might be used as a fiducial mark. In either case, the alignment performed in step 202 is sufficient that light from the alignment emitter 144, 144', 144", 146, and/or 146' may be detected at the corresponding output 130, 130', 130", 132, and/or 132'. In some embodiments, a vertical separation between the alignment emitter 144, 144', 144", 146, and/or 146' and waveguide 120, 120', 120", 122, and/or 122', respectively is maintained during the passive alignment to improve the changes that the light in a divergent beam from the alignment emitter 312 and/or

314 may be detected. In step 202, therefore, a rough alignment of the laser 140/140'/140" with the slider 104/140'/140" may be achieved.

The laser 140/140'/140" is actively aligned with the EAMR transducer 112/112'/112", via step 204. More specifically, the alignment laser 144/144'/144" and/or the alignment laser 146/146' is energized while the power output by output device 130/130'/130" and/or 132/132' is monitored. For example, a photodetector (not shown) might be used in step 204 to monitor the power output at the output device 130/130'/130" and/or 132/132'. The laser 140/140'/140" is moved relative to the slider 104/104'/104" until the desired alignment is achieved. In some embodiments, this corresponds to the output power detected exceeding a threshold and/or being within a tolerance of a maximum expected power. The laser 140/140'/140"' and slider 104/104'/104" are then affixed to each other, via step 206.

Thus, the EAMR disk drive 100, 100', and/or 100" may be formed. Because active alignment may be easily performed, alignment may be improved. Further, the alignment emitter 144'/146 may be independently powered. Thus, the alignment emitters may be turned off during regular operation of the EAMR disk drive 100". Thus, these improvements in alignment may be achieved without adversely affecting later performance.

Figure 7:
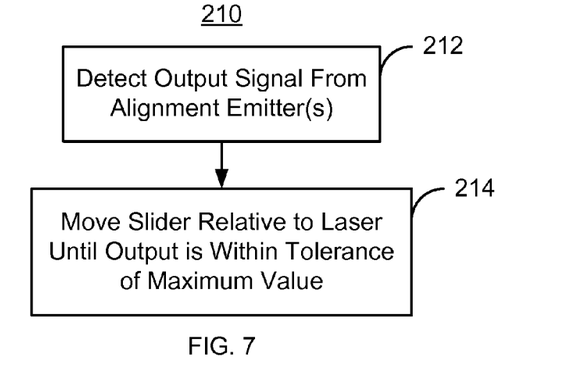
FIG. 7 depicts an exemplary embodiment of a method for actively aligning a slider and a laser in an EAMR disk drive.

FIG. 7 depicts an exemplary embodiment of a method 210 for actively aligning a laser with a slider. For simplicity, some steps may be omitted, combined, performed in parallel, performed in another sequence, and/or interleaved. The method 210 is described in the context of the EAMR disk drives 100/100'/100". However, the method 210 may be used to fabricate other EAMR disk drives. In addition, the method 210 is described in the context of fabricating a single disk drive 100/100'/100". However, multiple transducers, sliders, and multiple disk drives may be fabricated substantially in parallel. The method 210 may commence after the laser 140/140'/140" and slider 104/104'/104" are roughly aligned, for example via a passive alignment described above. The method 210 may thus be used as part of the method 200. Further, the method 210 commences after the alignment laser 144/144'/144" and/or the alignment laser 146/146' is energized.

An output signal is detected from the device 130/130'/130" and/or 132/132', via step 212. Stated differently, first light is detected. Thus, it can be determined that the laser 140/140'/140" and the slider 104/104'/104" are closely aligned enough to commence active alignment. The power output by output device 130/130'/130" and/or 132/132' is then monitored while the laser 140/140'/140" is moved relative to the slider 104/104'/104", via step 214. For example, a photodetector (not shown) might be used in step 214 to monitor the power output at the output device 130/130'/130" and/or 132/132'. Step 214 continues until the output power detected is within a tolerance of a maximum expected power, or until the output power exceeds a threshold. The laser 140/140'/140"' is then considered to be sufficiently closely aligned to the slider 104/104'/104".

Using the method 210, the components of, the EAMR disk drive 100, 100', and/or 100" may be aligned. Because active alignment may be easily performed, alignment may be improved. Because the alignment emitter 144'/146 may be independently powered, this improvement may be achieved without adversely affecting later performance.

Figure 8:
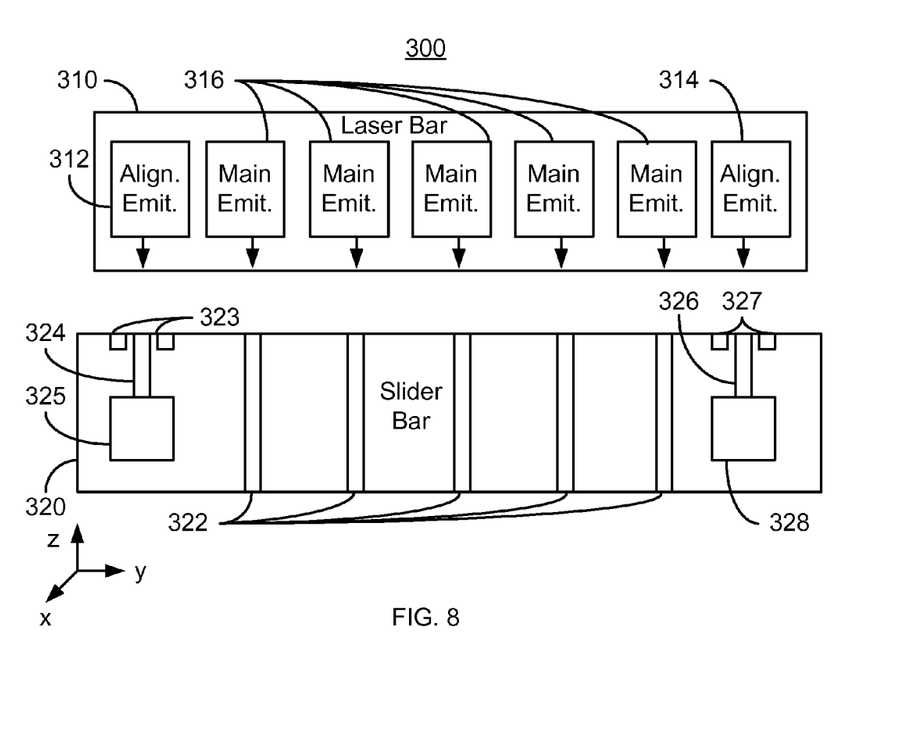
FIG. 8 depicts an exemplary embodiment of a slider bar and a laser bar for EAMR disk drives.

The methods 200 and 210 are described in the context of single EAMR heads 110/110'/110", individual sliders 104/104'/104", and single lasers 140/140'/140". However, the methods 200 and 210 and alignment lasers 144/144'/144" and alignment lasers 146/146' may be extended to higher level integration. For example, laser bars and slider bars may be used. FIG. 8 is a diagram depicting a system 300 for aligning multiple EAMR heads. For clarity, FIG. 8 is not to scale. In addition, although the system 300 is depicted in the context of particular components, other and/or different components may be used. In addition, although a particular number of lasers and sliders are shown on each bar, other numbers of lasers and/or sliders may reside on a bar. Further, the arrangement of components may vary in different embodiments.

The system 300 includes a laser bar 310 and a slider bar 320. The laser bar 310 includes multiple alignment emitters and multiple main emitters. In the embodiment shown, two alignment emitters 312 and 314 are used at the ends of the laser bar. The main emitters 316 reside between the alignment emitters 312 and 314. Each main emitter 316 may correspond to an EAMR head being fabricated. However, in other embodiments, an alignment emitter may be provided for each main emitter 316. In other embodiments, more alignment emitters may be provided, but their number will be less than the total number of main emitters 316. Stated differently, it may not be necessary to provide an alignment emitter for each main emitter 316. Further, six main emitters 316 are shown for simplicity. In other embodiments, another number of main emitters 316 may reside on a laser bar 310.

The slider bar 320 includes multiple sliders. Each slider includes a waveguide 322. Each waveguide may correspond to an EAMR head that has been fabricated. Thus, each waveguide 322 corresponds to a main emitter 316. The spacing between and location of the waveguides 322 thus corresponds to the spacing between and position of the main emitters 312. Further, waveguides 322 corresponding to six EAMR transducers are shown for simplicity. In other embodiments, another number of waveguides 322 and EAMR transducers may reside on a slider bar 320. In addition, alignment waveguides 324 and 326 and corresponding output devices 325 and 328 are shown. Although two alignment waveguides 32 and 326 and two output devices 325 and 328 are shown, another number may be used. In particular, an alignment waveguide 324 and 326 corresponds to each alignment emitter 312 and 314, respectively. The spacing between and position of the alignment waveguides 324 and 326 thus corresponds to the spacing between and position of the alignment emitters 312.

Using the slider bar 320 and laser bar 310, bar-to-bar alignment may be carried out. In particular, active alignment may be more easily performed using the alignment emitters 312/314 and alignment waveguides 324/326. Further, as multiple alignment emitters 312/314 and alignment waveguides 324/326 are used, the alignment in the x-y plane may be better achieved. Further, if additional alignment emitters and alignment waveguides are included, the active alignment in the x-y plane may be performed even if there is a failure in one of the alignment emitters 312/314 or alignment waveguides 324/326. Thus, fabrication of EAMR heads may be improved.

Figure 9:
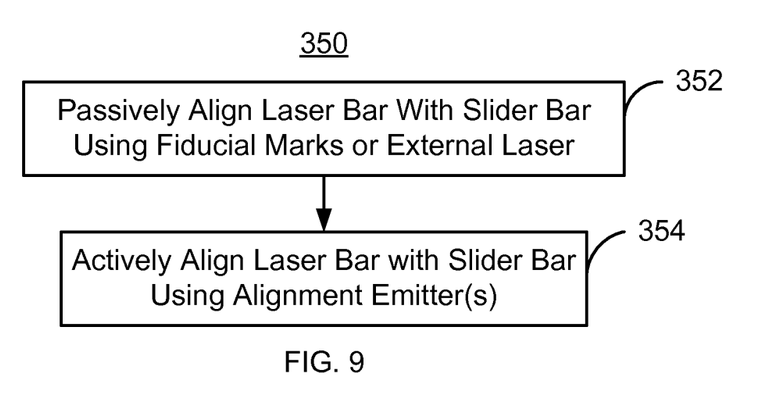
FIG. 9 depicts another exemplary embodiment of a method for fabricating an EAMR disk drive.

FIG. 9 depicts an exemplary embodiment of a method 350 for using an EAMR disk drive. For simplicity, some steps may be omitted, combined, performed in parallel, performed in another sequence, and/or interleaved. The method 350 is described in the context of the system 300. However, the method 350 may be used to fabricate other EAMR disk drives.

The laser bar 310 is passively aligned with the slider bar 320, via step 352. In some embodiments, step 352 is performed using fiducials 323 and/or 327. Alternatively, another external laser might be used. For example, an external laser might be optically coupled to the output 325 and/or 328. In such a case, the light travels backwards along the waveguide 324 and/or 326. The light from the external laser may be detected at the input of the waveguide 324 and/or 326. In either case, the alignment performed in step 352 is sufficient that light from the alignment emitter 312 and/or 314 may be detected at the corresponding output 325 and/or 328, respectively. In some embodiments, a separation between the laser bar 310 and slider bar 320 is maintained during the passive alignment to improve the changes that the light in a divergent beam from the alignment emitter 312 and/or 314 may be detected. In step 352, therefore, a rough alignment of the laser bar 310 with the slider bar 320 may be achieved.

The laser bar 310 is actively aligned with the slider bar 320, via step 354. More specifically, the alignment laser 312 and/or the alignment laser 314 are energized while the power output by output device 325 and/or 328 is monitored. For example, a photodetector (not shown) might be used in step 354 to monitor the power output at the output device 325 and/or 328. The laser bar 310 is moved relative to the slider bar 320 until the output power detected exceeds a threshold and/or is within a tolerance of a maximum expected power. The laser bar 310 and slider bar 320 may then be affixed to each other.

Thus, bar-to-bar active alignment may be more easily achieved. Because active alignment may be easily performed, alignment may be improved. Thus, fabrication and performance of the EAMR heads being formed may be improved.

We claim:

1. An energy assisted magnetic recording (EAMR) head comprising:
   a laser including a main emitter and at least one alignment emitter;
   a slider including at least one alignment waveguide, at least one output device, and an air-bearing surface (ABS), the at least one alignment waveguide being aligned with the at least one alignment emitter; and
   an EAMR transducer coupled with the slider and including a waveguide aligned with main emitter, the waveguide for directing energy from the main emitter toward the ABS.

2. The EAMR head of claim 1 wherein the main emitter and the at least one alignment emitter are configured to be powered independently.

3. The EAMR head of claim 1 wherein the at least one output device includes at least one output grating.

4. The EAMR head of claim 1 wherein the slider further includes:
   a plurality of fiducial marks in proximity to the at least one alignment emitter.

5. The EAMR head of claim 1 wherein the at least one alignment emitter includes a first alignment emitter and a second alignment emitter, and wherein at least one alignment waveguide includes a first alignment waveguide aligned with the first alignment emitter and a second alignment waveguide aligned with the second alignment emitter.

6. The EAMR head of claim 5 wherein the main emitter resides between the first alignment emitter and the second alignment emitter.

7. The EAMR head of claim 5 wherein the first alignment emitter resides between the main emitter and the second alignment emitter.

8. A method for providing an energy assisted magnetic recording (EAMR) head including a slider, an EAMR transducer coupled with the slider and a laser coupled with the slider, the method comprising:
   passively aligning the laser with the slider, the laser including a main emitter and at least one alignment emitter, the slider including at least one alignment waveguide, at least one output device, and an air-bearing surface (ABS), the EAMR transducer including a waveguide, the step of passively aligning the laser with the slider including passively aligning the at least one alignment waveguide with the at least one alignment emitter; and
   actively aligning the laser with the slider using the at least one alignment emitter, the at least one alignment waveguide, and the at least one output device.

9. The method of claim 8 wherein the step of actively aligning the laser with the slider further includes:
   detecting at least one output signal corresponding to the at least one alignment emitter from the at least one output device; and
   moving the slider relative to the laser until the at least one output signal is within a tolerance of a maximum value.

10. The method of claim 8 wherein the slider includes a plurality of fiducial marks in proximity to the at least one alignment waveguide and wherein the step of passively aligning the laser and the slider includes:
    aligning the at least one alignment emitter with the plurality of fiducial marks.

11. The method of claim 8 wherein the step of passively aligning the laser and the slider further includes:
    optically coupling at least one external laser with the at least one output device, external energy from the at least one external laser being output at the at least one alignment waveguide; and
    aligning the at least one alignment emitter with the external energy output at the at least one alignment waveguide.

12. The method of claim 8 wherein the at least one alignment emitter includes a first alignment emitter and a second alignment emitter, and wherein at least one alignment waveguide includes a first alignment waveguide aligned with the first alignment emitter and a second alignment waveguide aligned with the second alignment emitter.

13. The method of claim 12 wherein the main emitter resides between the first alignment emitter and the second alignment emitter.

14. The method of claim 12 wherein the first alignment emitter resides between the main emitter and the second alignment emitter.

15. A method for providing a plurality of energy assisted magnetic recording (EAMR) heads including a plurality of sliders, a plurality of EAMR transducers coupled with the plurality of sliders, and a plurality of main emitters coupled with the plurality of sliders, the plurality of sliders residing on a slider bar, the method comprising:
    passively aligning a laser bar with the slider bar, the laser bar including the plurality of main emitters and a plurality of alignment emitters, the slider bar including a plurality of alignment waveguides and a plurality of output devices, each of the plurality of EAMR transducers including a waveguide, the step of passively aligning the laser with the slider including passively aligning the plurality of alignment waveguides with the plurality of alignment emitters; and
    actively aligning the laser bar with the slider bar using the plurality of alignment emitters, the plurality of alignment waveguides, and the plurality of output devices.

16. The method of claim 15 wherein the step of actively aligning the laser bar with the slider bar further includes:
    detecting at least one output signal corresponding to the plurality of alignment emitters from at least one of the plurality of output devices; and
    moving the slider bar relative to the laser bar until the at least one output signal is within a tolerance of a maximum signal.

17. The method of claim 16 wherein the slider bar includes a plurality of fiducial marks in proximity to the at least one alignment waveguide and wherein the step of passively aligning the laser bar and the slider bar includes:
    aligning the plurality of alignment emitters with the plurality of fiducial marks.

18. The method of claim 16 wherein the step of passively aligning the laser and the slider further includes:
    optically coupling at least one external laser with the at least one of the plurality of output devices, external energy from the at least one external laser being output at the at least one of the plurality of alignment waveguides; and
    aligning the at least one alignment emitter with the external energy output at the at least one of the plurality of alignment waveguide.

19. The method of claim 15 wherein at least one of the plurality of alignment emitters corresponds to each of the plurality of main emitters.

20. The method of claim 15 wherein a total number of the plurality of alignment emitters is less than a total number of main emitters.

21. The method of claim 15 wherein the plurality of alignment emitters consist of a first alignment emitter and a second alignment emitter, at least a portion of the plurality of main emitters residing between the first alignment emitter and the second alignment emitter.

\* \* \* \* \*